United States Patent
Cornelius et al.

(10) Patent No.: US 6,424,458 B1
(45) Date of Patent: Jul. 23, 2002

(54) OPTICAL PRE-AMPLIFIER APPARATUS AND METHOD FOR RECEIVER PERFORMING WINDOWED AND GAIN CHANGE RATE CONTROL

(75) Inventors: Steven W. Cornelius, Dunwoody, GA (US); Robert Corwin, Finksburg, MD (US); Todd Appleton, Alpharetta, GA (US)

(73) Assignee: Ciena Corporation, Linthicum, MD (US)

( * ) Notice: Subject to any disclaimer, the term of this patent is extended or adjusted under 35 U.S.C. 154(b) by 10 days.

(21) Appl. No.: 09/746,217

(22) Filed: Dec. 22, 2000

(51) Int. Cl.[7] .................................................. H01S 3/00
(52) U.S. Cl. ................................. 359/341.4; 359/341.41
(58) Field of Search .......................... 359/341.4, 341.41

(56) References Cited

U.S. PATENT DOCUMENTS

| | | | |
|---|---|---|---|
| 5,335,109 A | * 8/1994 | Heidemann | 359/341 |
| 5,517,351 A | * 5/1996 | Hatakeyama | 359/341 |
| 5,854,704 A | * 12/1998 | Grandpierre | 359/189 |
| 5,900,968 A | 5/1999 | Srivastava et al. | 359/341 |
| 5,923,462 A | 7/1999 | van der Plaats | 359/341 |
| 6,025,941 A | 2/2000 | Srivastava et al. | 359/119 |
| 6,057,951 A | * 5/2000 | Sugawara | 359/194 |

OTHER PUBLICATIONS

Optical Components Porfolio PP–10G fromNortel Networks Web Page, (printed Dec. 11, 2000).

Hamamatsu Photodiodes, Catalog No. KPD0001E07, pp. 1–11, 24–35, 56,57, and 62–67, (Nov. 1998).

* cited by examiner

*Primary Examiner*—Mark Hellner
(74) *Attorney, Agent, or Firm*—Michael R. Cammarata

(57) ABSTRACT

A receiver node includes an optical amplifier optically coupled to the input of a receiving device such as a PIN photodiode. A controller inputs received power level values from the receiver to perform gain control. The input signal of an optical receiving device is pre-amplified by an optical amplifier such that the amplified signal is within a dynamic range of the receiving device. Windows are utilized to trigger the gain control algorithm such that when the received power level is inside a first window the gain control is turned off. When the received power level is outside the second window, the gain control is turned on. Additional windows may be used to adjust the rate of gain change. The rate of gain change is decreased as the magnitude of the difference between the current received power level and the target received power level decreases. Pump power levels may be fed back to the controller such that a soft limit may be imposed on to limit he maximum pump power and thereby prevent receiver damage.

24 Claims, 16 Drawing Sheets

OPTICAL PRE-AMPLIFIER APPARATUS AND METHOD FOR RECEIVER PERFORMING WINDOWED AND GAIN CHANGE RATE CONTROL

BACKGROUND OF THE INVENTION

1. Field of Invention

The invention generally relates to optical communication receivers. The invention more particularly relates to optically pre-amplified receiver nodes.

2. Description of Related Art

In conventional long-haul optical communications applications, the loss between the laser transmitter and the receiver is typically fixed or otherwise substantially invariant. Therefore, a gain block with fixed optical gain serves the purpose of ensuring that the receiver will receive a signal within the receiver's dynamic range.

In some applications such as metropolitan optical ring networks, however, the loss between the laser transmitter and the receiver often changes due to changes in the span loss or due to channel upgrades. During channel upgrades, extra OADMs (optical add drop multiplexers) are added into the optical path of existing channels, therefore the loss between the transmitter and the receiver changes.

Furthermore, a complete fiber cut, fiber disconnect or other major fault in either a long haul or metro application can cause a loss of signal. As recognized by the inventors, the restoration of the optical signal following a loss of signal event may damage the receiver and/or cause bit errors.

Hence, in these applications a smart pre-amplified receiver is needed that will adapt to changing conditions such as those outlined above.

SUMMARY OF THE INVENTION

The invention includes an apparatus for optically preamplifying a signal being input to a receiving device, comprising: an optical amplifier optically coupled to an input port of the receiving device, the optical amplifier optically amplifying an input signal and outputting the amplified signal to the receiving device; a controller operatively connected to the receiving device, the controller receiving power measurements from the receiving device indicative of the amplified signal's optical power; and a pump optically coupled to said optical amplifier, the pump injecting pumping light into the optical amplifier to provide the optical amplification of the input signal; the controller commanding a pump power level output by the pump to perform gain control according to the power measurements received from the receiving device; and the controller commanding the pump power level output by the pump such that the optical amplifier turns off gain control when the power measurements received from the receiving device are inside a first window of received power values.

Furthermore, the controller may command the pump power level output by the pump such that the optical amplifier turns on gain control when the power measurements received from the receiving device are outside a second window of received power values.

Still further, the controller may change a rate of commanded pump power level changes according to how much a current received power level differs from a target received power level.

Alternatively, the controller may change the rate of commanded pump power level changes such that the rate is decreased as the magnitude of the difference between the current received power level and the target received power level decreases.

In another alternative, the controller may change the rate of commanded pump power level changes to a first, second and third value when the magnitude of the difference between the current received power level and the target received power is greater than a first, second and third threshold, respectively.

In general, the controller may also limit a rate of change of pump power levels.

Also, the controller may place a limit on the commanded pump power level such that the controller only permits said pump to amplify the input signal up to the limit and thereby prevents damage to the receiving device.

The invention also includes a method of optically preamplifying a signal being input to a receiving device with an optical amplifier optically communicating with an input of the receiving device, comprising: receiving power measurements indicative of the amplified signal's optical power; commanding a pump power level of a pump optically coupled to the optical amplifier, the pump injecting pumping light into the optical amplifier to provide the optical amplification of the input signal; controlling said commanding step to perform gain control according to the power measurements received by said receiving step; and said controlling step controlling said commanding step to command the pump power level output by the pump such that the optical amplifier turns off the gain control when the power measurements received from said receiving step are inside a first window of received power values.

The controlling step may control the commanding step to command the pump power level output by the pump such that the optical amplifier turns on the automatic gain control when the power measurements received from said receiving step are outside a second window of received power values.

The invention may also change a rate of commanded pump power level changes according to how much a current received power level differs from a target received power level.

Also, the changing step may change the rate of commanded pump power level changes such that the rate is decreased as the magnitude of the difference between the current received power level and the target received power level decreases.

In addition, the changing step may change the rate of commanded pump power level changes to a first, second and third value when the magnitude of the difference between the current received power level and the target received power is greater than a first, second and third threshold, respectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expressions "optically communicates" and "optically coupled" as used herein refer to any connection, coupling, link or the like by which optical signals carried by one optical system element are imparted to the "communicating" or "coupled" element. Such "optically communicating" or "optically coupled" devices are not necessarily directly connected to one another and may be separated by intermediate optical components or devices.

Figure 1:
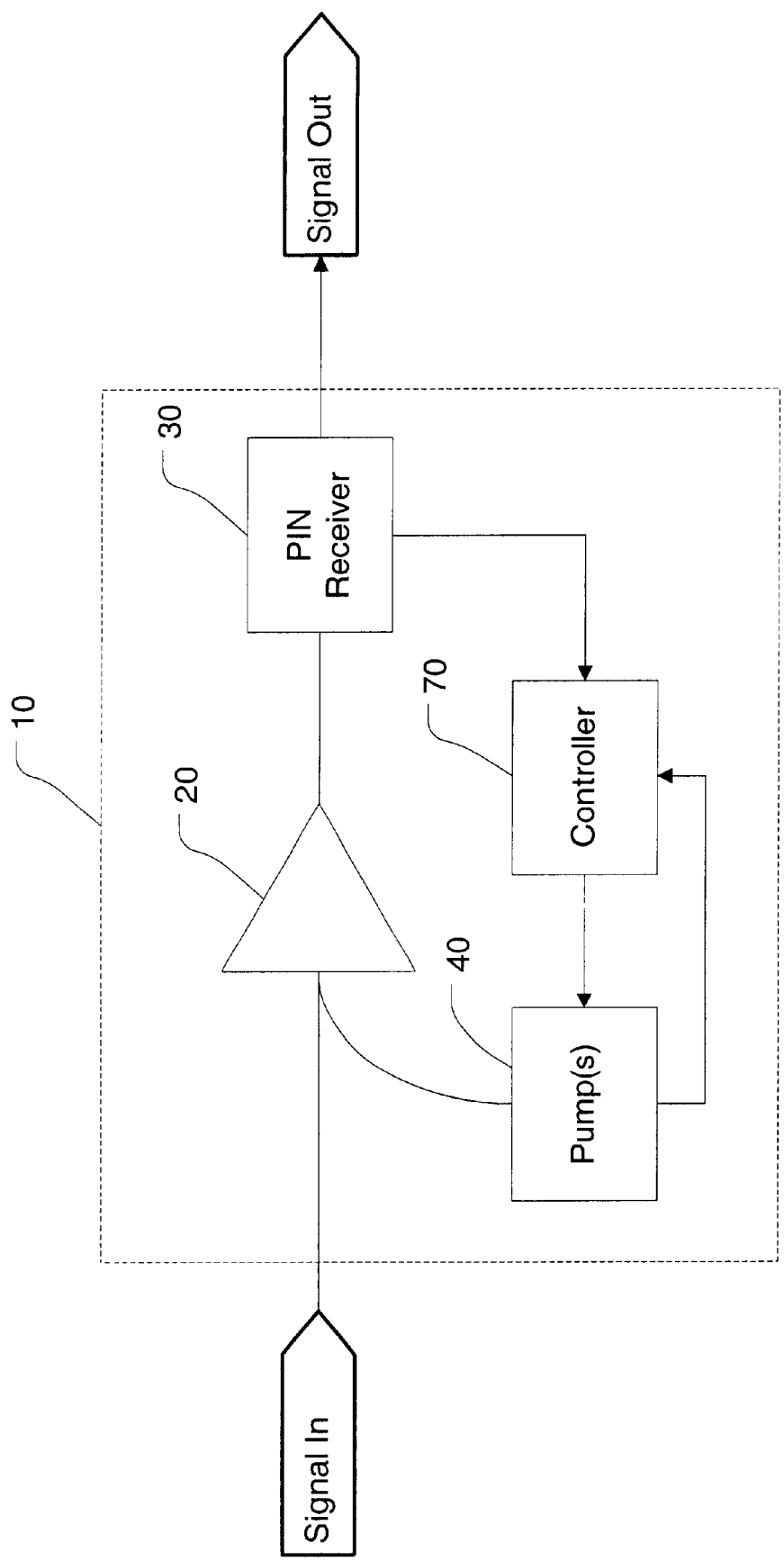
FIG. 1 is a block diagram of a receiving node according to the invention.

FIG. 1 illustrates a construction of the inventive pre-amplified receiver node 10 which will also be referred to herein as a receiver node 10.

The receiver node 10 includes an optical amplifier 20 which may be constructed from conventional rare-earth doped fiber amplifiers such as an EDFA (erbium doped fiber amplifier). It is to be understood that EDFA is just one, non-limiting example of a rare-earth doped fiber amplifiers and that other types of such amplifiers can be used to construct amplifier 10 consistent with the invention.

A pump 40 is optically coupled to the optical amplifier 20. Pump 40 is another conventional element that includes one more lasers (hence, the label pump(s) in the figure) that inject pumping light into the optical amplifier 20. It is also to be understood that pump(s) 40 may include one or a plurality of pumping lasers operating at one or more pumping wavelengths as is known in the art.

Pump 40 may also include conventional associated electronics (not shown) to activate the pumping lasers including, for example, a DAC (digital analog converter) that may be used to convert a digital control signal from controller 70 to an analog control signal that adjusts the pump power. Pump 40 is operable over a range of pump powers which may be commanded by, for example, sending a pump power level command to the pump 40.

PIN receiver 30 is optically coupled to the output of the amplifier 20. PIN receiver 30 is a conventional device that includes a PIN photodiode with a power measurement capability. The power measurement taken by PIN receiver 30 is output to the controller 70 as further described below in the operation section.

Although a PIN-type receiver 30 is shown in the figures, it is also possible to use the inventive techniques with other types of receivers such as avalanche photodiode type (APD) receivers. Since a PIN diode is inexpensive compared to an APD and also because of possible noise issues associated with an APD (the avalanche process in the APD is inherently noisy) a PIN diode may be preferred.

Controller 70 is operatively connected to the PIN receiver 30 as well as to the pump 40. Specifically, controller 70 is operatively connected to a power level output of the PIN receiver 70 and to a pump power level command input of the pump 40. The pump 40 may also feed back or otherwise communicate the current pump power level via the same or separate (shown in FIG. 1) path to the controller 70. Alternatively, the controller 70 may internally store the current pump power level.

The term "connection" and "operative connection" as used herein is a relative term and does not require a direct physical connection. This is particularly true in relation to the controller 70 which communicates with what may be physically distant components such as the PIN receiver 30 and pump 40. For example, controller 70 may communicate with these elements by using a communication pathway over a fiber span, an Internet connection, or wireless communication pathway. Such alternative communication pathways may be convenient in view of the potentially physically distinct locations that may be provided for the various elements.

Controller 70 may be constructed in a variety of fashions utilizing electronic components, optical components, computer hardware, firmware, software or a combination thereof. Typical examples in the electronic domain include FPGAs (field programmable gate arrays), ASICs (application specific integrated circuits), and microprocessors such as a general purpose microprocessor programmed with inventive software as outlined below. Controller 70 may also utilize processing resources of an existing controller of a network to which the receiver node is operatively connected such as a network element controller, terminal controller, or network managing controller.

Figure 2:
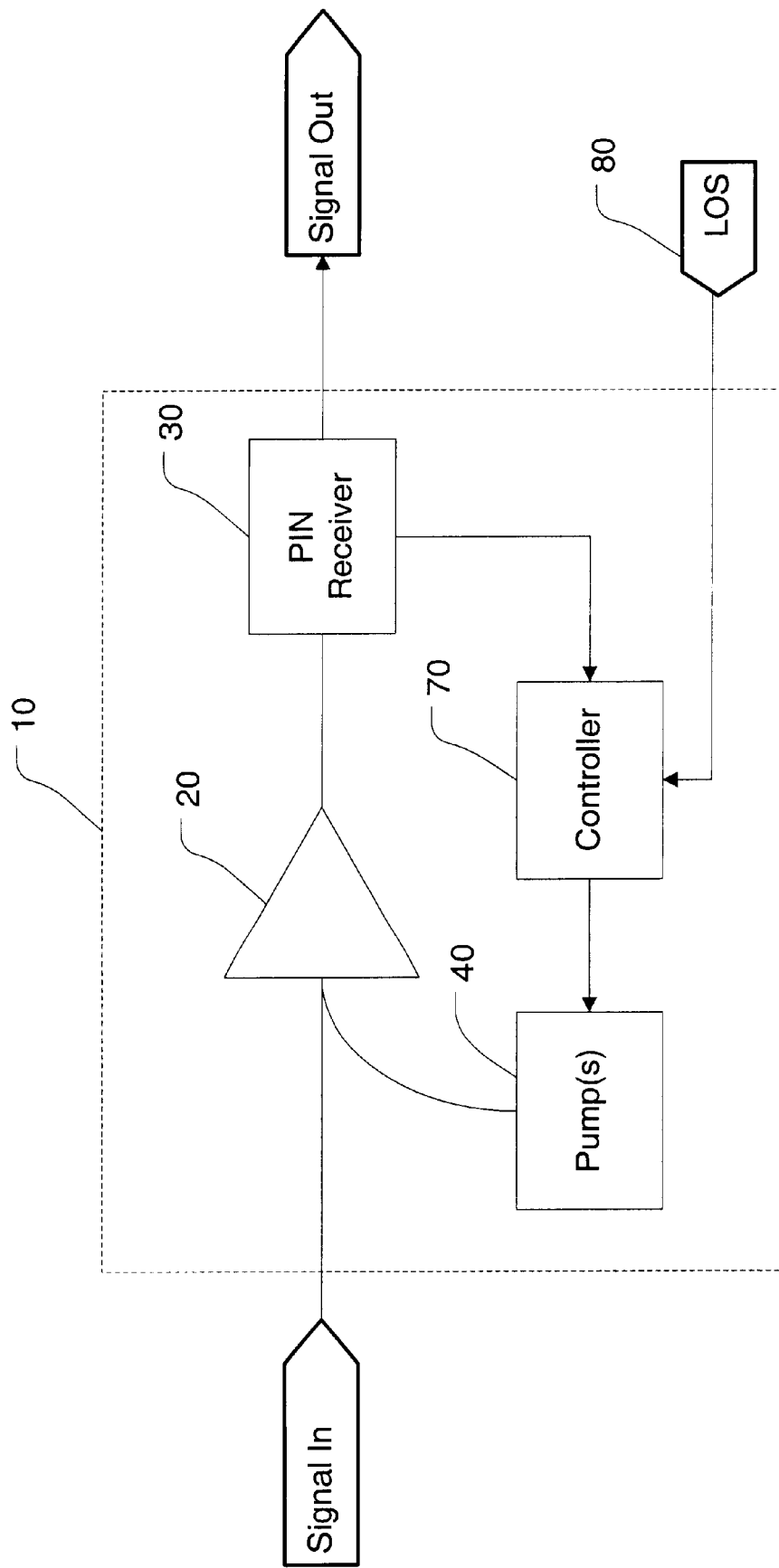
FIG. 2 is a block diagram of an alternative construction for the receiving node according to the invention.

FIG. 2 shows an alternative construction for the receiver node 10. Rather than receive feedback from the pump 40 regarding the current pump power level, the controller 70 may also receive a LOS (loss of signal) declaration from a LOS port 80. The LOS port 80 transmits a LOS declaration from another device (not shown). Such other devices may include an NCP (network control processor) or other device capable of recognizing a LOS event and transmitting a LOS declaration to the LOS port 80.

Furthermore, the LOS port 80 may receive the LOS declaration via a conventional service channel. Service channels are typically used to convey various information about the optical network and there are a variety of examples of such service channels and associated architectures. One example uses a distinct wavelength of a WDM (wavelength division multiplexed) system to convey the service channel. The service channel wavelength may be selected from the data signal and routed to the LOS port to thereby transmit the LOS declaration from any of the components of the optical network. Further details of LOS declaration processing are described below in the operation section.

Figure 3:
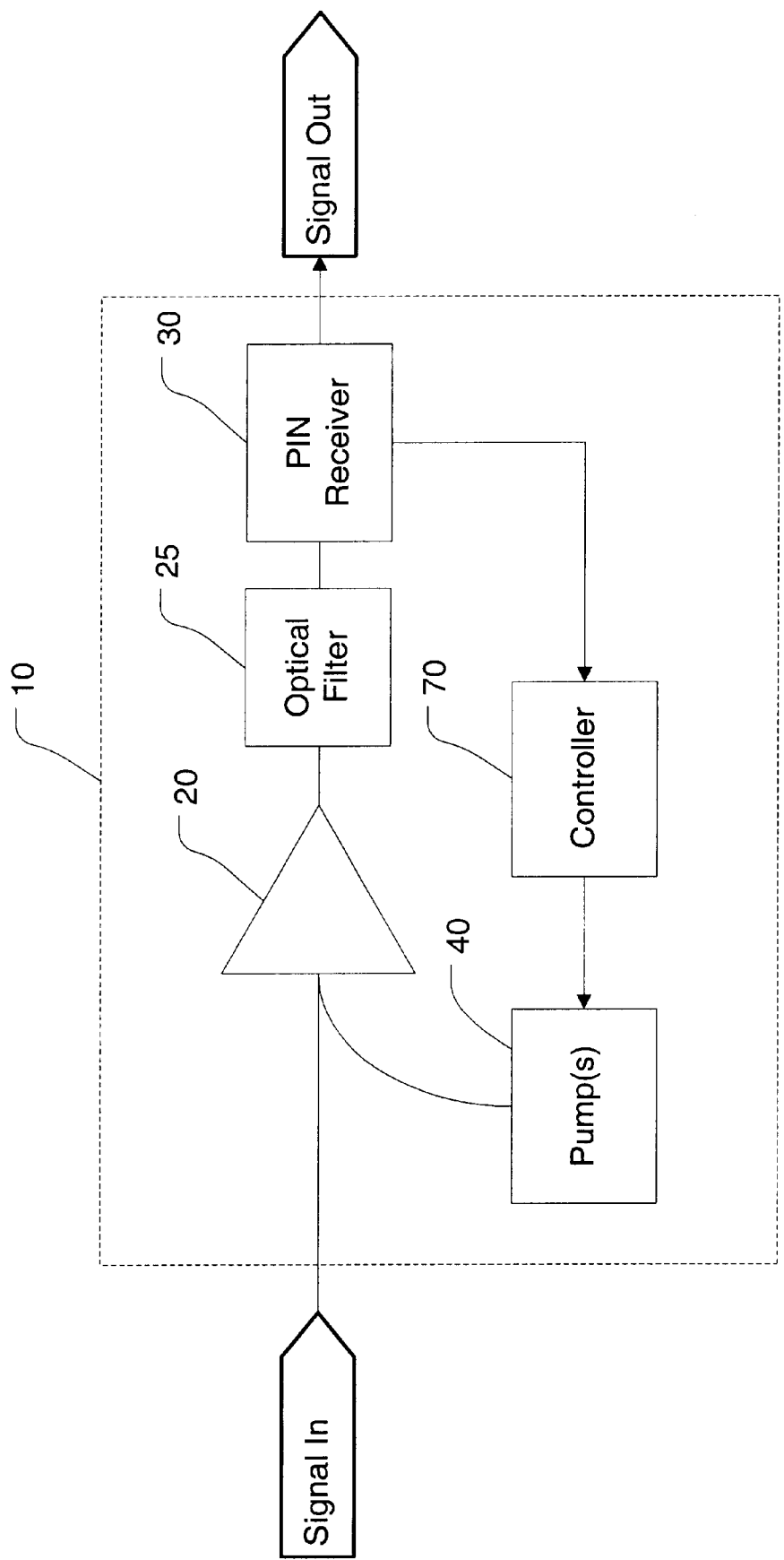
FIG. 3 is a block diagram of another alternative construction for the receiving node according to the invention.

FIG. 3 shows another alternative construction for the receiver node 10. Rather than receive feedback from the pump 40 regarding the current pump power level, the controller 70 may also receive power levels detected by PIN receiver 30. As further described below in the operation section, such received power levels may be used by the controller 70 to declare a LOS event. To minimize the effect of noise (e.g. on the LOS declaration decision and on the gain controlling features described below), an optical filter 25 may be used. Specifically, an optical filter 25 may be optically interconnected between the amplifier 20 and the PIN receiver 30.

Optical filter 25 may be constructed from, for example, conventional thin film dielectric filter(s), a combination of fiber Bragg grating and/or optical power splitter, or a combination of fiber Bragg grating with optical circulator to act as a band pass filter. The band pass of optical filter 25 should include the center wavelength of the input signal in order for the PIN receiver 30 to successfully pick-up the amplified input signal.

The optical filter 25 may also be utilized in the other constructions shown in FIGS. 1 and 2.

Figure 4:
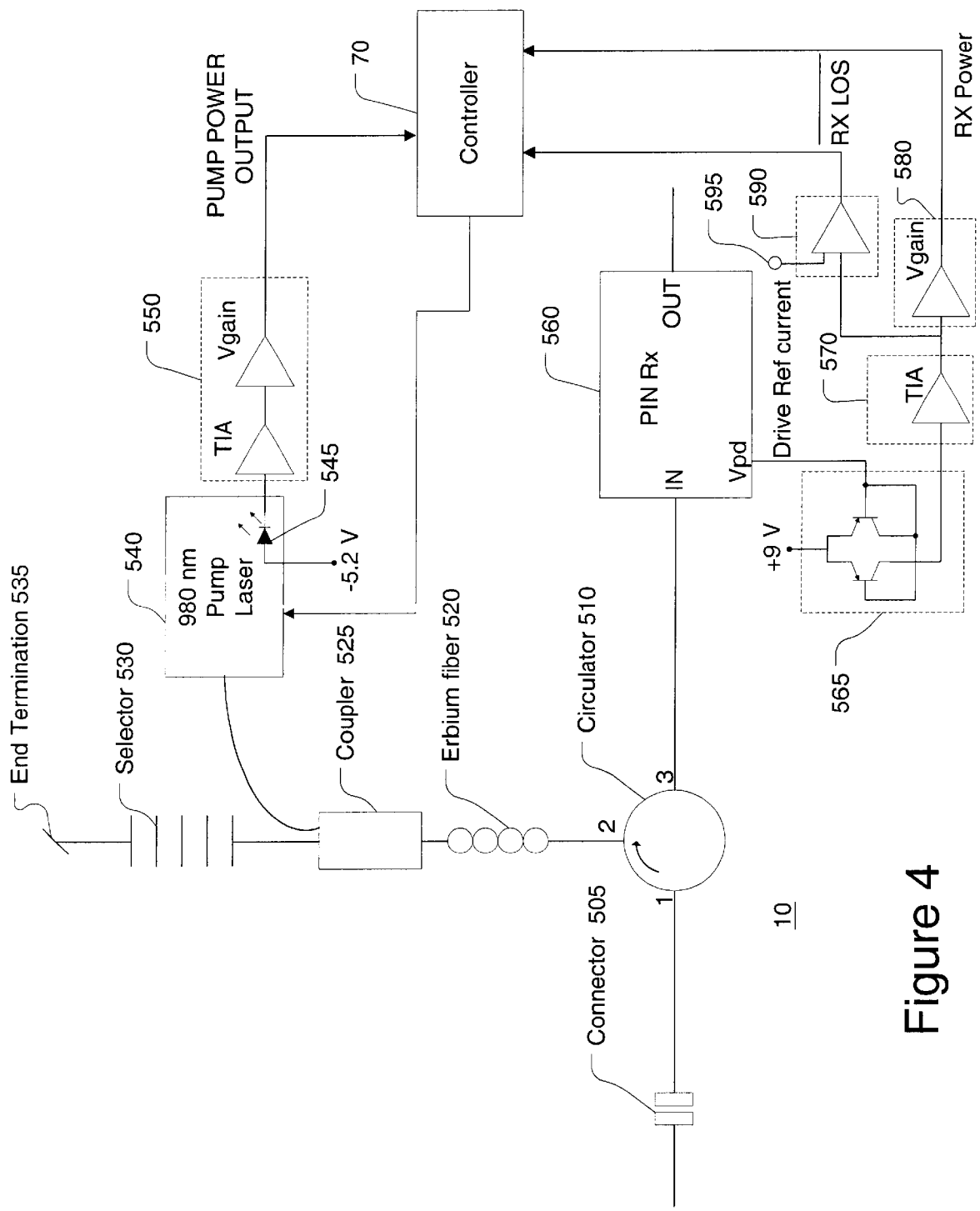
FIG. 4 is a block diagram of yet another alternative construction for the receiving node according to the invention.

FIG. 4 illustrates a more specific embodiment of the inventive receiver node 10. As shown therein, a connector 505 may be used to connect the receiver node to a system or Signal In port. Of course, a fiber splice may be used instead of a connector 505 as is known in the art.

More importantly, FIG. 4 shows a circulator 510 which is a conventional optical device that takes an optical input at one port (e.g. port 1) and outputs it at another port (e.g. port 2). The circulation is as shown from port 1-->port 2-->port 3.

A section of Erbium doped fiber 520 is in optical communication with port 2 of circulator 510. As with optical amplifier 20 discussed above, the Erbium doped fiber 520 may be constructed from other conventional rare-earth doped fibers.

A selector 530 optically communicates with the Erbium fiber 520 via coupler 525. Selector may be constructed from an in-fiber Bragg grating or other conventional wavelength selection element(s) such as an arrayed waveguide grating or dielectric filter.

An end termination 535 may be connected to the selector 520. End termination may be constructed with an angled fiber cut or other conventional optical termination element.

Pump laser 540 may be optically coupled to the Erbium fiber 520 via coupler 525. As shown in FIG. 4, a 980 nm laser provides a preferred output pumping light wavelength and is preferred because Erbium doped fiber 520 is most efficiently pumped by this wavelength. Of course, a 1480 nm could be used alone or in combination with the 980 nm laser. Other wavelengths may be appropriate depending upon the type of optical amplifier used.

Pump laser 540 also shows some of the conventional associated electronics referred to above in relation to pump 40. Namely, pump 540 may include a conventional backfacet diode 545 that measures the output pump power. This backfacet diode 545 is conventionally supplied a voltage such as the −5.2 V shown in FIG. 4. A current is typically output from the backfacet diode 545 and may be converted to a voltage with a TIA (transimpedance amplifier) and Vgain (voltage shifting amp) the combination of which may be labeled a signal conditioner 550. This current to voltage conversion and level shifting are particularly advantageous if the controller 70 expects a voltage within a certain range. As further shown in FIG. 4, the conditional signal (pump power output) may be supplied to the controller 70.

The pump power output from pump 540 may be used for a variety of purposes such as calibration, alarms, diagnostics, and control. In this invention, the pump output power may be used to declare a LOS (loss of signal) condition.

As with pump 40, pump 540 is operable over a range of pump powers which may be commanded by, for example, the controller 70 sending a pump power level command to the pump 540.

The top half of FIG. 4 essentially illustrates a double pass EDFA configuration in which the input signal is amplified twice by the pumping light from pump 540. Specifically, the input signal from port 2 of circulator 520 passes through Erbium fiber 520 and is amplified by the pumping light from pump 540 during this first pass. The desired channel wavelength is then reflected by selector 530 and then makes a second pass through Erbium fiber 520 where it is amplified a second time by the pumping light from pump 540.

A double pass EDFA configuration such as the one shown in FIG. 4 has several advantages depending upon the application. Specifically, it uses a shorter length of Erbium fiber 520 than a single pass EDFA and therefore reduces the cost and saves space. The space savings incurred may permit the receiver node to be integrated onto a common circuit board. Furthermore, the use of selector 530 reduces noise and permits the second pass through the Erbium fiber 520.

The selector 530 when used as shown in the FIG. 4 can reduce the effect of adjacent channels since only the signal of interest is reflected by the selector 530. Other adjacent channels are not reflected by the grating. This mechanism serves to improve the performance even in the presence of an imperfect OADM or other upstream device dropping a channel to receiver node 10. If adjacent (or nonadjacent) channels leak through the OADM, during the first pass through the amplifier 530, all signals are amplified, however during the second pass only the signal of interest is amplified and the other signals are not reflected by the wavelength selective element. This serves to improve the adjacent (and non adjacent) channel rejection.

After making the second pass through Erbium fiber 520, the amplified signal light passes through circulator 510 (entering port 2 and exiting port 3) on its way to the PIN receiver 560. PIN Rx (PIN receiver 560) is essentially like the PIN receiver 30 described above in relation to FIGS.

1–3. Again, a PIN photodetector need not be used and other photodetectors such as an APD may be substituted.

As further shown in FIG. 4, the PIN Rx 560 includes an input signal port, an output signal port and a received power level output port (designated as Vpd and Drive Ref current). The received power level may be derived from components internal to the PIN Rx 560 as shown or may utilize external components such as a splitter or tap and a another photodetector to measure received input power.

FIG. 4 also illustrates electronic circuitry to handle the received power level output (Vpd). Specifically, a high-impedance drive circuit 565 may be connected to Vpd so that effectively no load is placed on Vpd to read the signal. In this way, a more accurate detection of the received power level may be made. The high-impedance drive circuit 565 may be constructed from a current mirror as shown in FIG. 4 or with other electronic circuitry as is known in the art.

Since the output of high-impedance drive circuit 565 is a current, a current-to-voltage converter 570 may be advantageously used to condition the signal for proper handling by controller 70. As shown in FIG. 4, the current-to-voltage converter may be constructed with a TIA (transimpedance amp). The output voltage from current-to-voltage converter 570 may be level shifted by level shifter 580 (Vgain). Again, the current to voltage conversion and level shifting are particularly advantageous if the controller 70 expects a voltage within a certain range. As further shown in FIG. 4, the conditional signal (received power) may be supplied to the controller 70.

Another option for the receiver node 10 of FIG. 4 is to use a comparator 590 to compare the received power level against a threshold 595 to determine whether a LOS event has occurred (RX LOS). This RX LOS signal may be supplied to controller 70 as shown. Furthermore, the threshold 595 may be a factory setting, manually adjusted or automatically adjusted (e.g. by controller 70).

Figure 5:
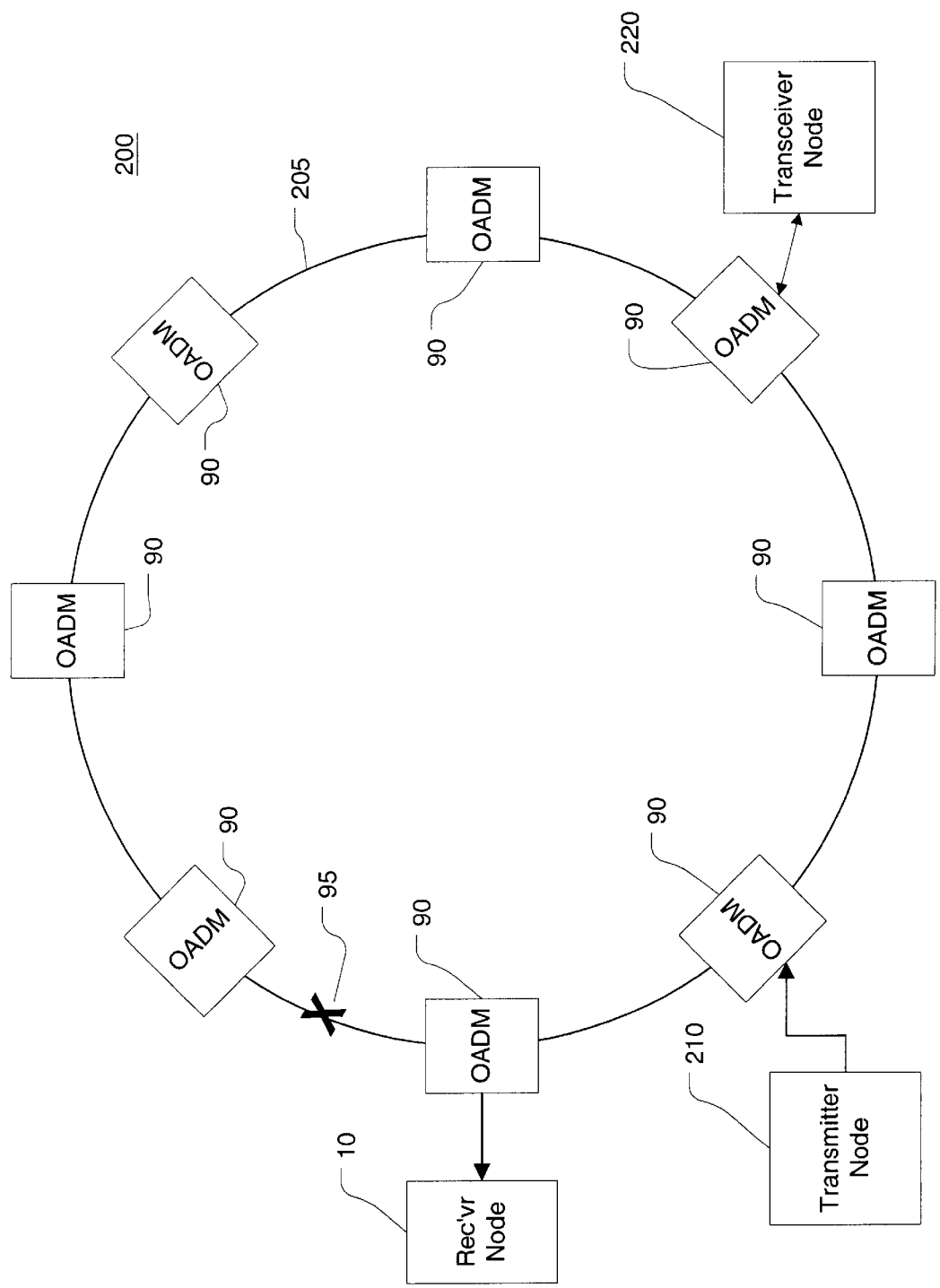
FIG. 5 is a block diagram of a metro ring communications architecture incorporating a receiving node according to the invention.

FIG. 5 illustrates a system architecture 200 and possible location for the inventive receiver node 10. System architecture 200 is a typical ring network, commonly referred to as a metropolitan network because it primarily serves metropolitan areas. Ring network 200 includes a plurality of OADMs 90 that add and drop channels on the ring 200. The OADMs 90 are interconnected in a ring configuration with individual spans or lengths of optical fiber such as span 205.

The ring network 90 may carry a single wavelength or multiple wavelengths (e.g. WDM, DWDM) utilizing a signaling format such as SONET (synchronous optical network), SDH (synchronous digital hierarchy), or GbE (gigabit Ethernet). The signal may utilize any such signaling format but is preferably data balanced and utilizes NRZ signaling. The format and wavelength(s) utilized are largely irrelevant to the invention as the invention's purpose is to improve the reception of a separated wavelength. Such wavelength separation in a WDM or DWDM system is a known technique that will not be described further here. It is sufficient to state that the receiving node 10 receives an optical signal ("Signal In" as shown in FIGS. 1–3 and connector 505 in FIG. 4) carrying at least one wavelength of interest.

One or more channels are placed onto the ring network 200 by devices such as the transmitter node 210 and transceiver node 220 as further shown in FIG. 5. It is also possible to include the receiver node 10 within the receiver portion of transceiver node 220. Furthermore, the receiver node 10 may also be integrated within the OADM 90 by optically coupling the receiver node 10 to a drop channel output of the OADM 90.

The ring network 200 may suffer from a fiber cut 95 as further shown in FIG. 5. The invention includes special techniques for dealing with LOS (loss of signal) events such as fiber cut 95. Details are explained below in the operation section.

It is to be understood that the ring network 200 shown in FIG. 5 is but one non-limiting example of the type of ring network in which the invention may be incorporated. The size, number of OADMs, connectivity and other factors may vary significantly and still benefit from the receiver node 10 of the invention.

Figure 6:
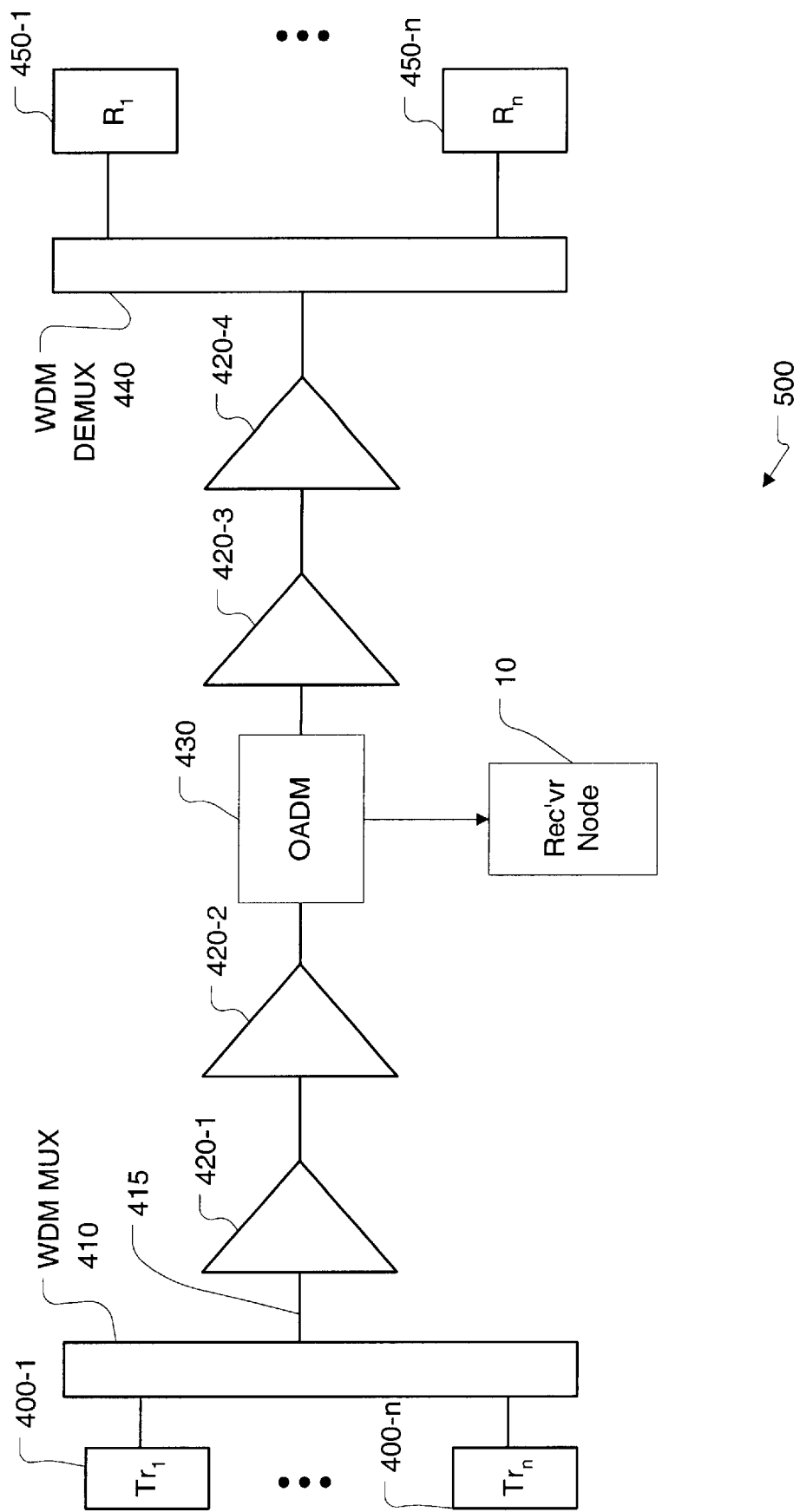
FIG. 6 is a block diagram of a long haul communications architecture incorporating a receiving node according to the invention.

FIG. 6 illustrates another architecture 500 and possible location for the inventive receiver node 10. System 500 is a linear WDM network that is conventionally used to transmit optical signals over long distances.

In particular, FIG. 6 illustrates a WDM system 500 including a plurality of transmitters $Tr_1$ to $Tr_n$ (400-1 to 400-n) each of which emits one of a plurality of optical signals. Each of the plurality of optical signals are at a respective one of a plurality of wavelengths. The optical signals are output to and combined, using a conventional WDM multiplexer 410, onto an optical communication path 415, comprising, for example, an optical fiber. A chain of optical amplifiers 420-1 to 420-4 are coupled in series along optical communication path 410.

A WDM demultiplexer 440 is coupled to optical communication path 415 at the end of the amplifier chain. Each of the outputs of WDM demultiplexer 410 are coupled to a respective one of receivers 450-1 to 450-n, which convert the optical signals to corresponding electrical signals.

Between amplifiers, such as amps 420-2 and 420-4, an OADM 430 may be situated. The OADM drops one or more channels and sends the dropped channel to the receiver node 10 optically coupled thereto.

It is to be understood that the number of amplifiers 420, location of the OADM 430, and overall structure of the system 500 may vary. FIG. 6 is merely intended to illustrate a possible relationship between the receiver node 10 and a linear optical network.

Figure 7:
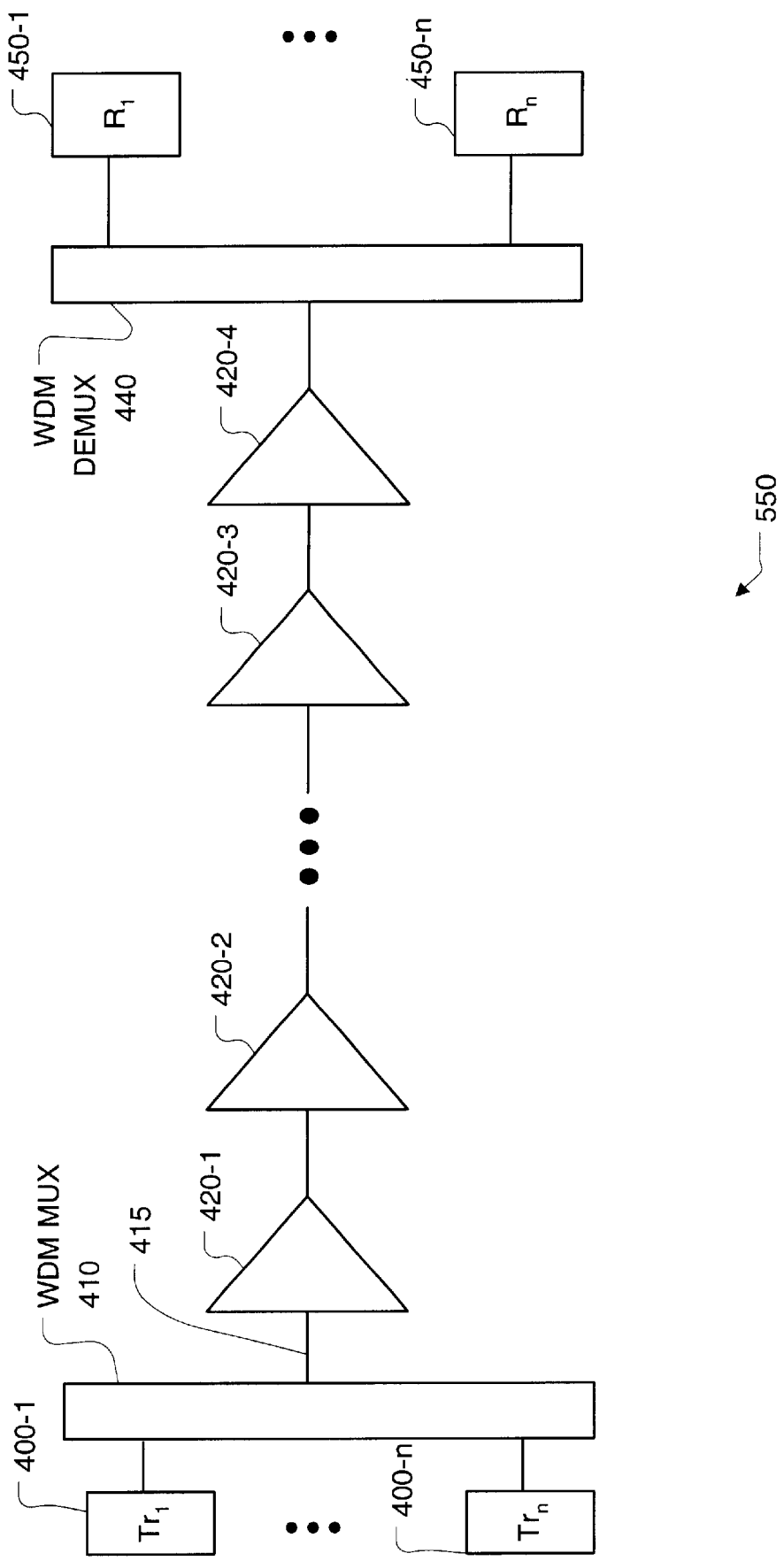
FIG. 7 is a block diagram of another long haul communications architecture incorporating a receiving node according to the invention.

FIG. 7 illustrates another architecture 550 and possible location for the inventive receiver node 10. The system 550 is quite similar to system 500 of FIG. 6. Instead of a mid-span drop with OADM 430 as in system 500, the terminal end of system 550 may be enhanced by the invention. Specifically, one or more of the receivers 450-1 to 450-n may have a structure similar to that of any one of receiver nodes 10 described above in relation to FIGS. 1–4.

Operation of Invention

In general terms, one embodiment of the invention controls the pump 40 (or pump 540) such that the optical power incident on the PIN receiver 30 (or 560) is within a certain range (e.g. ±2 dB of a target received power level) by monitoring the optical power incident on the PIN receiver 30. If for some reason the incoming signal strength degrades due to, for example, channel upgrades or other variations the invention automatically increases pump power level and, thereby, the gain of the optical amplifier 20 to keep the power incident on the PIN receiver 30 within the desired range. Similarly, if the loss between the source and the receiver node 10 decreases, the optical signal power (e.g. as measured at the PIN receiver 30) increases and the invention decreases the pump power level and thereby the gain of the optical amplifier 20.

Figure 8:
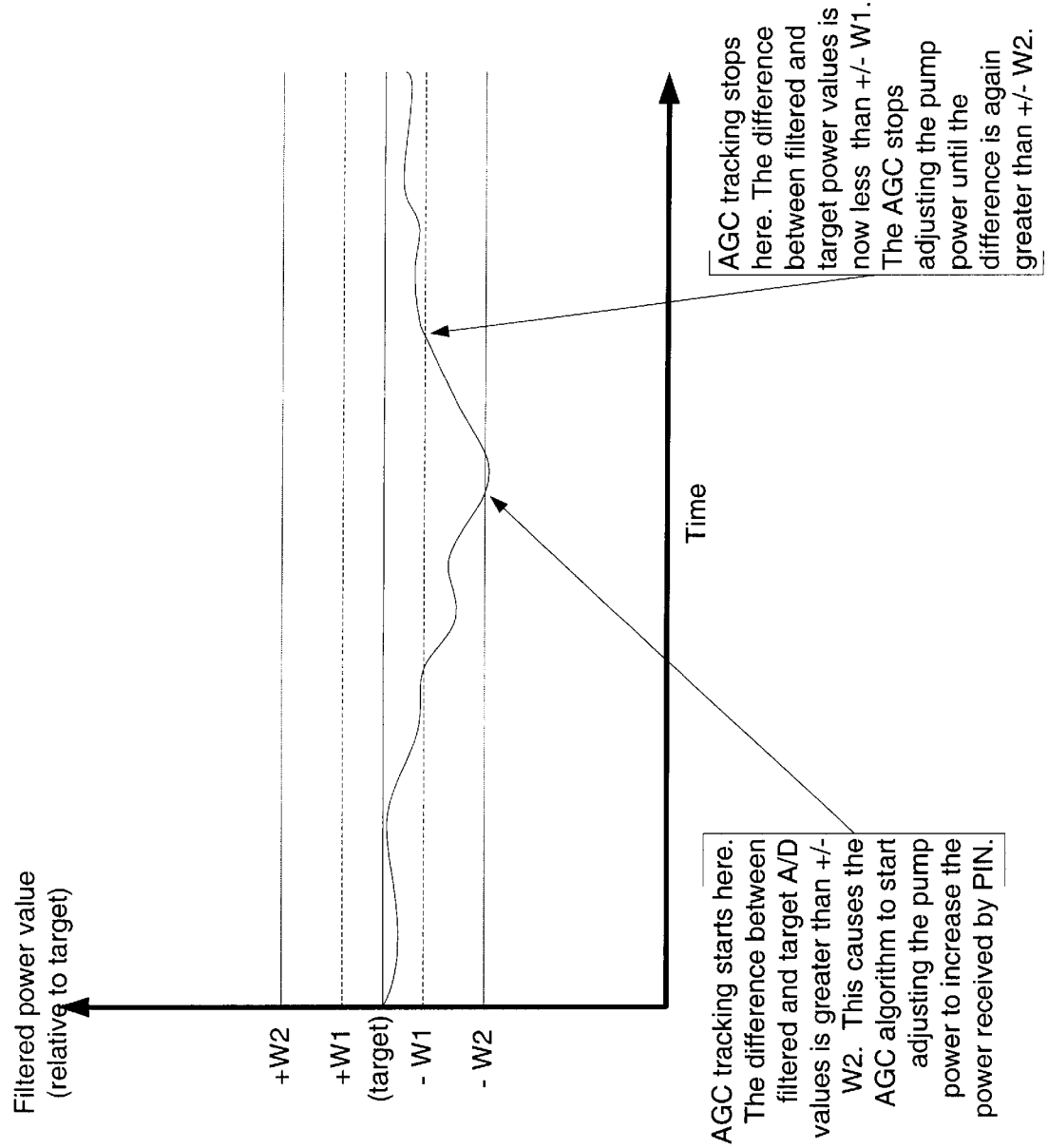
FIG. 8 is a graph of filtered power level (relative to target power level) versus time illustrating some of the windowing and gain control features of the invention.

To improve this general methodology of the first embodiment, the invention may utilize windows to trigger the gain control algorithm. As shown in FIG. 8, a target power level is chosen the selection of which may be governed by the noise characteristics of a particular model of PIN receiver 30 and "Signal In" wavelength. In general, once the target power level has been accurately determined, the same level may be used for PIN diodes from various manufacturers As further shown in FIG. 8 a pair of windows surround the target level. A first window is designated by +W1 and −W1. A second window is designated by +W2 and −W2. The first window is the desired received power value range. Preferably, the invention will permit the received power level to vary within the first window and take no corrective action while within this first window. The second window acts as a trigger to turn the gain control algorithm described above On and Off. For example and as further shown in FIG. 8, when the received power level crosses the −W2 threshold, then the gain control algorithm is turned On. When the received power level crosses from the second window into the first (crossing −W1 in this example), the gain control algorithm is turned off.

The use of such windows is particularly advantageous in the optical signaling and reception environment. Adjusting the pump 40 power excessively may introduce noise and cause the BER (bit error rate) to rise. Any increase in the BER is unacceptable as the specifications for BER are extremely demanding (on the order of $10^{-15}$ bit errors per second being an acceptable BER). The use of windows reduces the amount of pump 40 power level changes and possible race round conditions due to minor variations in power and thereby prevents an increase in the BER.

The windowing concept has other advantages for companies deploying the invention. To illustrate this advantage, consider the situation in which the received power level is clamped to a specific value and that no windows are used. In that case, a company deploying such a system would not see normal signal variations (e.g. caused by degrading power losses) and would be unable to properly diagnose and monitor the system. Such degradations would go unnoticed because they would be automatically corrected by gain clamping. If the windowing concept is utilized, on the other hand, such normal signal variations could be detected and utilized to advantage such as early diagnosis of system problems.

Although the windows W1 and W2 are illustrated as being separate windows it is also possible to set W1=W2.

Figure 9:
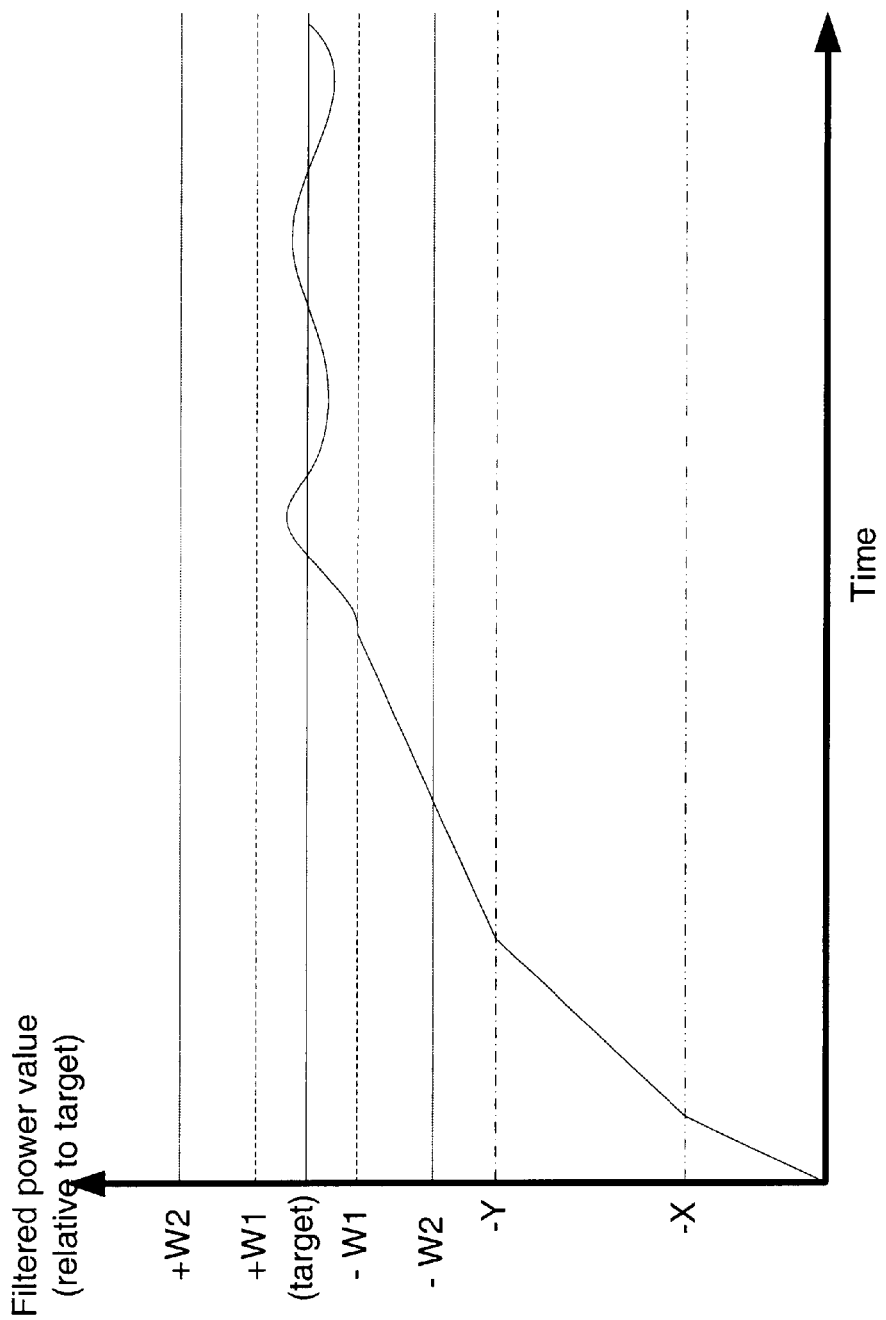
FIG. 9 is a graph of filtered power level (relative to target power level) versus time illustrating some of the gain rate change control features of the invention.

The windowing concept discussed above may also be extended to further advantage. Specifically, one or more additional windows may be utilized to adjust the gain change rate. Such gain change rate windows are illustrated in FIG. 9. For simplicity, FIG. 9 only shows the bottom half of the gain change rate windows including the bottom halves of the first gain change rate window (indicated by −X) and the second gain change rate window (indicated by −Y). It is to be understood that the top half of these windows also exist and that negative changes in the gain change rate can be similarly made.

As will be further described in relation to the flowchart of FIG. 10, when the received power level is below −X (relative to the target) then the gain change rate is steep. In this way, the gain of optical amplifier 20 may be quickly adjusted and brought closer to the desired range (+/−W1). Since the signal is far outside the desired range the effect on BER is much less important and may be ignored particularly when the signal is so far out of range as to be undetectable or not detectable with accuracy. When the received power level is below −Y but above −X (relative to the target) then the gain change rate is adjusted to be more shallow that the first gain change rate. The gain change rate may again be adjusted when the signal is above −Y so that this third gain change rate is shallower than the second.

The idea is to adjust the gain change rate according to the magnitude of the difference between the target and measured received power level such that the gain change rate is decreased as this magnitude decreases. While three separate gain change rates are shown in FIG. 9 it is also possible to use a different number of rates such as 2, 4 or more. Furthermore, the gain change rate may be something other than a step-function and may, for example, vary continuously.

Although instantaneous received power levels may be utilized as basis of control, it is preferable to use filtered value that smoothes local variations. More specifically, a filtering algorithm such as a moving average or moving mean may be used to track the received power level. In this way, local variations in the received power level may be smoothed and thereby prevent excessive pump power level changes and thereby reduce the BER.

The controller 70 is responsible for executing the inventive methodologies. By performing the inventive methods, controller 70 may generate appropriate control signals or pump power level commands to control the output power level of pump 40 and, thereby, the gain of optical amplifier 20.

Figure 10:
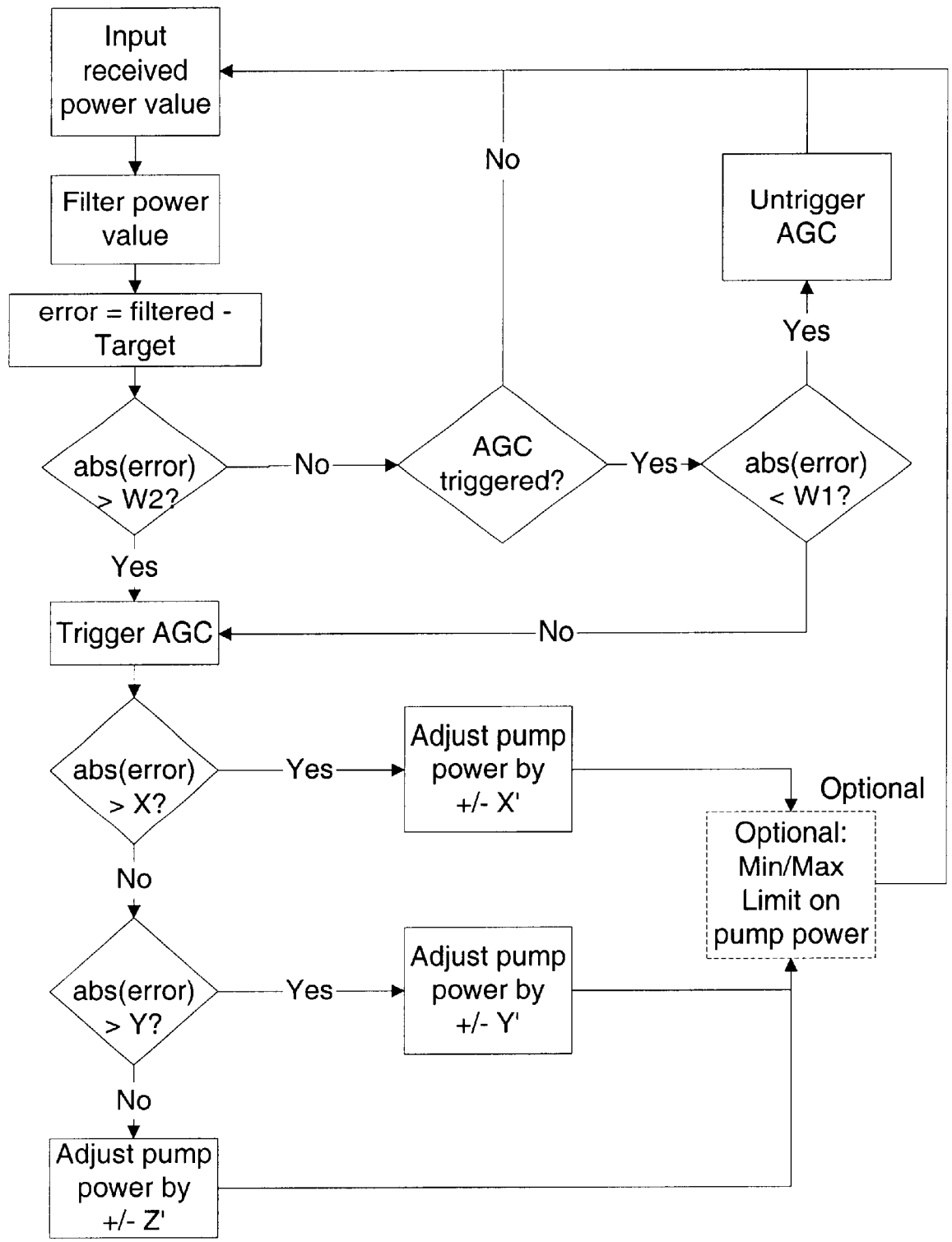
FIG. 10 is a high-level flowchart illustrating some the windowing and gain rate change control features of the invention.

FIG. 10 is an example of a formalized control methodology according to the invention for performing gain control utilizing the windowing concepts outlined above. As shown therein, the method may start by inputting the received power value (e.g. from PIN receiver 30 or 560). This input received power value is then preferably filtered. As mentioned above, the invention preferably uses a filtering step such as a moving average to calculate a filtered power level ("filtered" in the flowcharts).

The filtered power value is then utilized to make a first decision. Specifically, the difference between the filtered power value and the target is calculated (error=filtered−target). If the absolute value of this error is greater than W2 (outside the second window), the automatic gain control algorithm described above is triggered. If inside the second window (absolute value of error less than or equal to W2), then a check is made as to whether the AGC (automatic gain control algorithm as outlined above) has already been triggered: if not, then the method loops back to the beginning and inputs another power value (e.g. from the PIN receiver 30 or 560) and if yes a check is made to see if the error value is within the first window. If within the first window (absolute value of error<W1), then the AGC is untriggered (turned off). In this way, the AGC may be triggered when outside the second window W2 and untriggered when inside the first window W1.

As further shown in FIG. 10 once the AGC is triggered, the invention then proceeds to decide how fast to change the pump power level and, thereby, the gain of the optical amplifier. In other words, the method following the Trigger AGC step decides the gain change rate. The upper path is a fast gain change rate, the middle path is a medium gain change rate and the bottom path is a slow gain change rate (X'>Y'>Z' and X>Y). It is to be understood that the invention is not limited to three gain change rates and may use only two or more than three.

More specifically, a first decision block decides whether the difference between filtered power level and target value is greater than X (absolute value of error>X) and, if so, adjusts the pump power level by +/−X'. A second decision block decides whether the difference between filtered power level and target value is greater than Y (absolute value of error>Y) and, if so, adjusts the pump power level by +/−Y'. If not, the controller 70 adjusts the pump power level by +/−Z'. The method then loops back and iterates the steps described above.

As also shown in FIG. 10, an optional step may be used to place a limit on the pump power. In other words, following the adjustment of the pump power level (by X', Y' or Z'), the method may then optionally limit or clip the pump power level.

Figure 11:
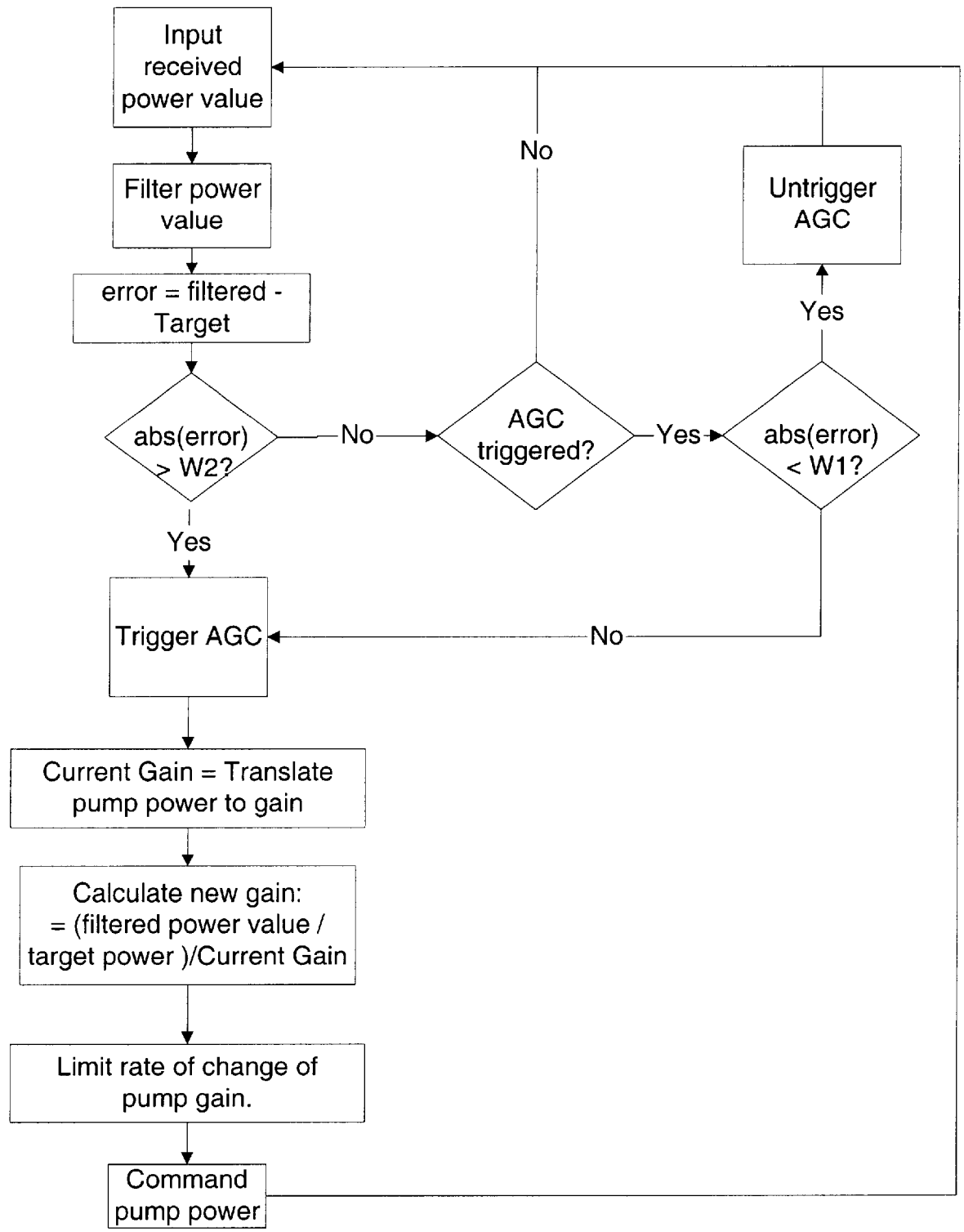
FIG. 11 is a high-level flowchart illustrating alternatives to the windowing and gain rate change control features of the invention illustrated in FIG. 10.

FIG. 11 illustrates a different way of implementing gain control according to the invention. As FIG. 11 shares features with FIG. 10, only the differences will be elaborated all of which occur after the AGC is triggered.

In the above discussion, the term "pump power level" was used interchangeably with optical gain. More accurately, however, the pump power level may be translated to optical gain. This is particularly true when the relationship therebetween in nonlinear and a look-up-table or other function may be used to relate the two quantities. FIG. 11 reflects this by including a translation step in which the current gain is equal to the translated pump power.

Rather than utilize discrete gain change rate levels as in FIG. 10, FIG. 11 uses a calculation. The new gain may be calculated as a function of the filtered power value, target power and current gain (e.g. new gain=(filtered power value/target power)/current gain. The calculated gain value may then be subjected to a limit so that the rate of change of pump gain may not exceed a threshold value.

After making the above calculations, the pump power level may be commanded. The method then iterates to continue inputting received power values, windowing to trigger AGC, calculating new pump power levels and commanding the pump power level as further shown in FIG. 11.

Another significant and independent feature of invention comes into play upon the occurrence of a LOS event such as a fiber cut 95, disconnection or other major problem which causes the received signal to degrade to such a point that it may not be accurately detected. To illustrate this feature, consider the following scenario: under normal conditions, an incoming signal strength may be −35 dBm. To keep the signal strength at the PIN receiver 30 substantially constant at ∼−10 dBm, the amplifier 20 will be pumped by pump 40 to supply a gain of 25 dB.

Under these conditions, assume a fiber cut 95 (e.g. no light gets through to the receiver) or other LOS event. If the algorithms described above were to run on their own, the pump 40 power to the amplifier 20 would be increased until the pump 40 laser is maxed out. To avoid this condition, a soft limit may be placed to limit the maximum amplifier pump 40 power. However, if the pump 40 power level setting is left at that soft limit level, when the signal is restored the high gain from the amplifier 20 coupled with a strong signal could blow out or otherwise damage the PIN receiver 30.

To address this concern, whenever an LOS event is declared, the amplifier pump 40 power is changed so that the gain from the amplifier 20 is set to a Home Gain value. When the signal is restored (LOS event over) and if the incoming signal is too low (but above LOS), the Home Gain will allow the detection of the signal by the PIN receiver 30. The gain control algorithms described above (or other gain control schemes) may then kick in to bring the pump 40 power within a desired (e.g. optimal) range. The Home Gain value is selected such that when the signal is restored, a strong incoming signal amplified by the Home Gain would be low enough so as not to cause PIN receiver 30 damage.

The LOS declaration may be accomplished in a variety of fashions by the invention. The controller 70 may declare a LOS when the pump power level reaches or exceeds a threshold value. In other words, as the signal degrades the gain control algorithm will attempt to compensate by increasing the pump 40 power level and, thereby the gain of the amplifier 20. At a threshold point, the controller 70 will then decide that the signal is so weak (or nonexistent) that further increases in the pump 40 power level are futile and that a LOS event has occurred. By utilizing a threshold level in this fashion, the controller 70 may declare that a LOS event has occurred. The structure shown in FIG. 1 is quite useful to implement this technique by providing a feedback path from the pump 40 to the controller 70, the path feeding back the pump power level to the controller 70 so that the controller 70 may make the LOS declaration decision. FIG. 4 shows an exemplary way in which to implement this feedback path by utilizing a backfacet diode 545 to measure pump 560 power.

Alternatively, the LOS declaration may be received from LOS port 80 as described above in relation to FIG. 2. The LOS declaration may be made by other device (not shown) connected to the LOS port 80. Examples of such devices include a performance monitor. Furthermore, the LOS declaration may be made by deciding whether the quality of service (QoS), bit error rate (BER) or other signal quality measure has degraded beyond an acceptable level.

Another alternative is to use the received power level to decide whether to declare a LOS event. The structures shown in FIGS. 3 and 4 are quite useful for this alternative. As described above in relation to FIG. 3, the controller 70 may also receive power levels detected by PIN receiver 30. FIG. 4 shows a specific architecture for providing received power levels (RX Power) to controller 70. Such received power levels may be compared against a threshold by the controller 70 to declare a LOS event. To minimize the effect of noise (e.g. on the LOS declaration decision and on the gain tracking feature described below), an optical filter 25 may be used as further illustrated in FIG. 3 or the selector 530 may be used as further illustrated in FIG. 4.

In addition, the various LOS declaration methods may be combined to ensure that an actual LOS event has occurred.

Figure 12:
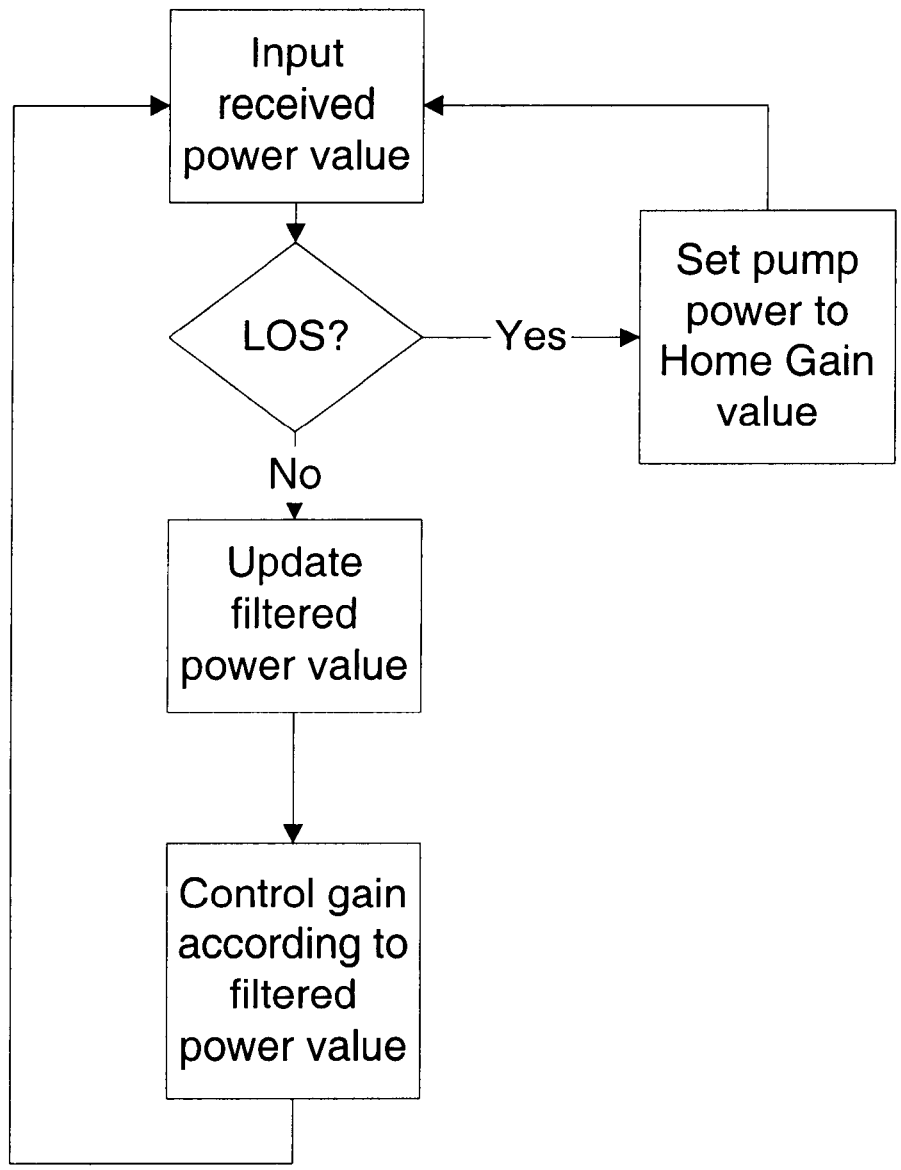
FIG. 12 is a high-level flowchart illustrating some of the LOS declaration and home gain setting features of the invention.

FIG. 12 is an example of a formalized control methodology according to the invention for performing LOS declaration processing. First, the controller 70 inputs or otherwise receives a power level value (e.g. from the PIN receiver 30 or other received power level measuring device). A decision is then made as to whether an LOS event has been declared using any of the methods described above. If an LOS event has occurred, then the controller 70 commands the pump power level to be a Home Gain value and the method loops back to the input step.

If no LOS has occurred or if the LOS event is over, then the filtered power value is updated. Again, the filtered power value preferably smoothes local variations in the received power level and should be updated periodically. After updating the filtered power value, the method then controls the gain by adjusting the pump power level according to the filtered power value. This adjustment may be performed in accordance with the gain control algorithms described above or with other gain control algorithms to bring the received power level within a desired range.

Figure 13:
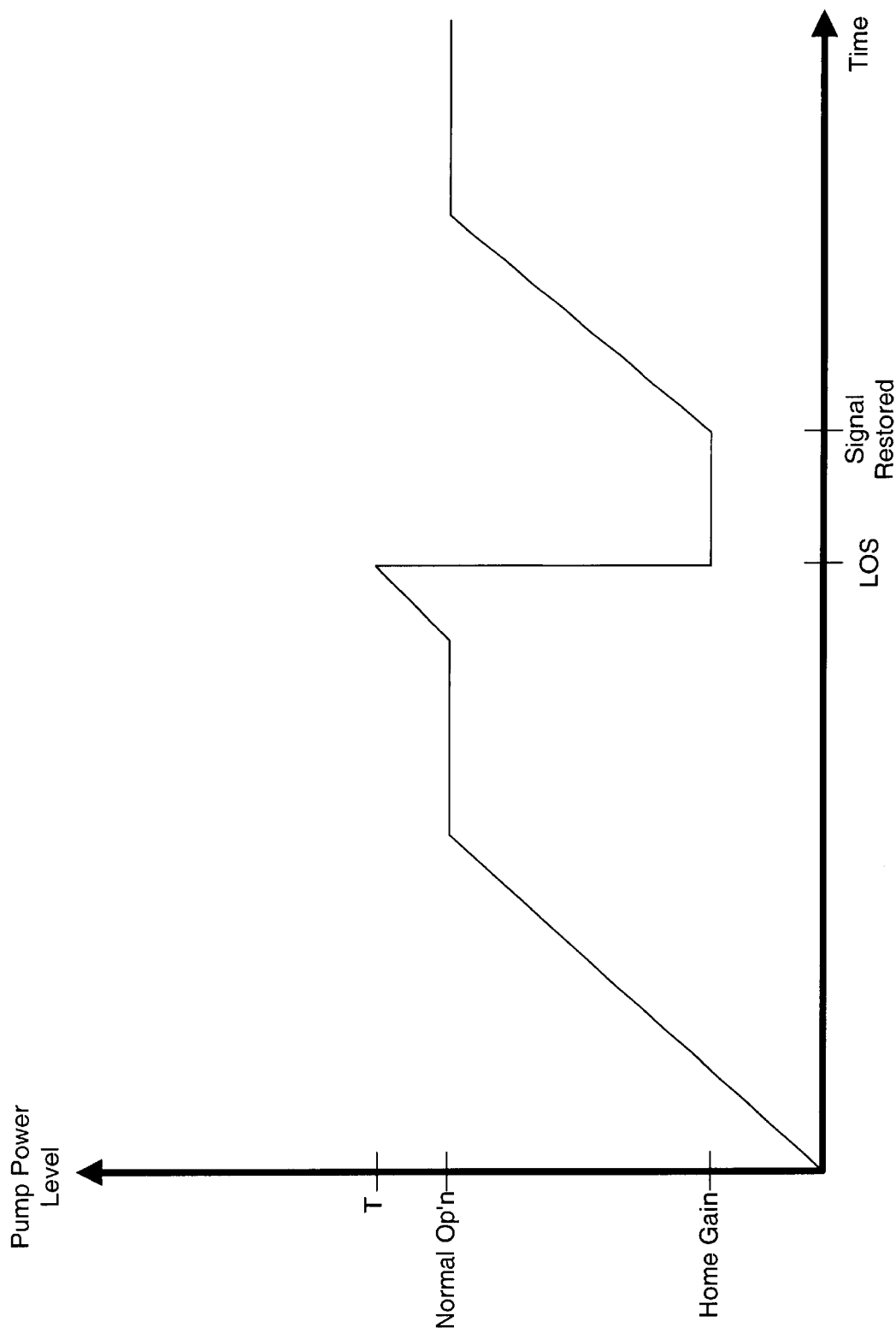
FIG. 13 is a graph of pump power level versus time illustrating some of the LOS declaration and home gain setting features of the invention set forth in FIG. 12.

FIG. 13 graphically illustrates the return to Home Gain upon LOS declaration feature outlined above in relation to FIG. 12. FIG. 13 is an exemplary graph plotting pump power level versus time. The pump power level may be ramped up as shown until normal operation is achieved. A steady state situation may then follow as further illustrated. When the signal degrades, the pump power level is increased until it reaches threshold T at which point, the controller 70 declares a LOS event and sets the pump power level to a Home Gain value. When the signal is restored, pump power levels are permitted to increase again up to a normal operational level.

Figure 14:
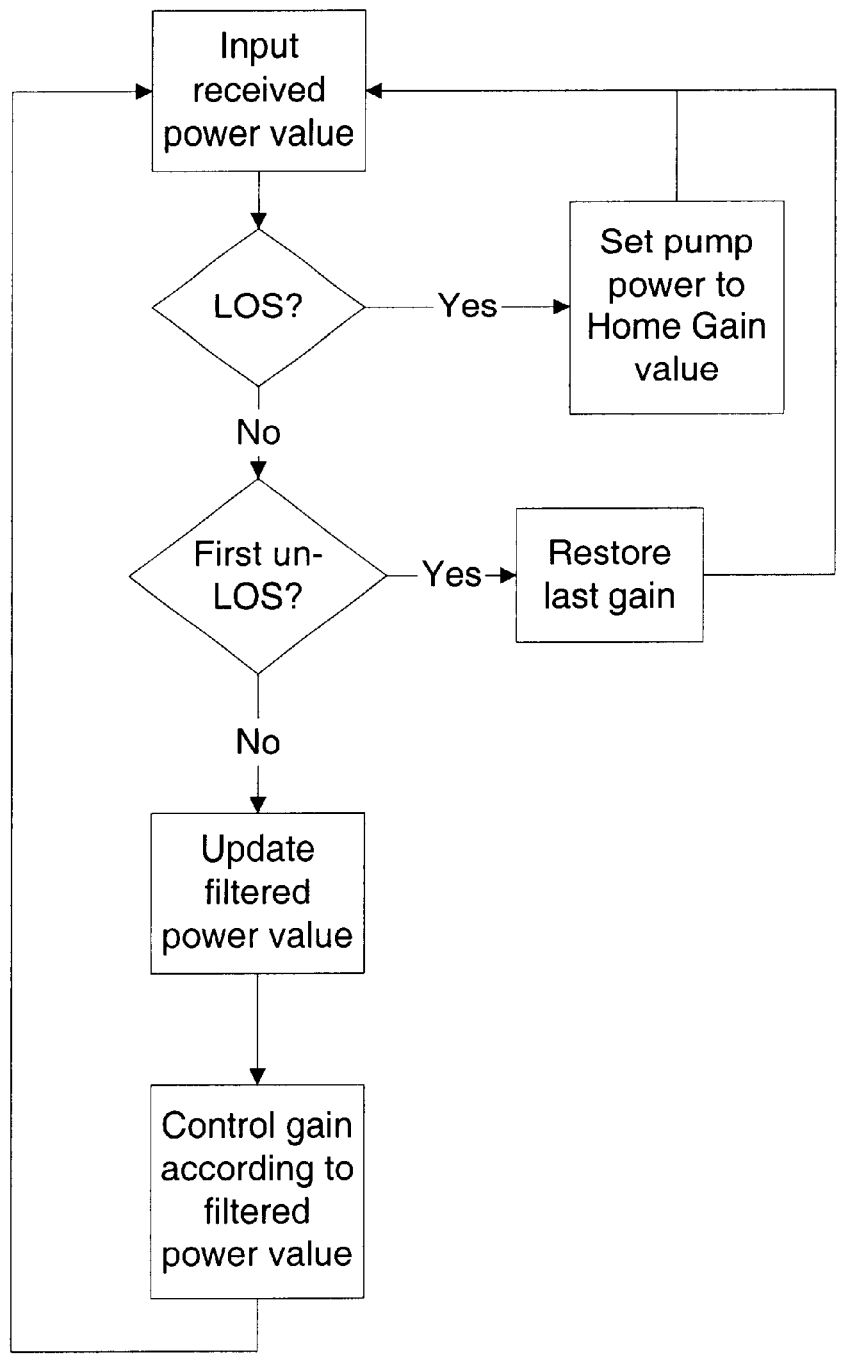
FIG. 14 is a high-level flowchart illustrating another alternative to the LOS declaration and home gain setting features of the invention illustrated in FIG. 12.

FIG. 14 illustrates another aspect of the return to home gain feature. As FIG. 14 shares steps with FIG. 12, only the differences will be explained here. After determining whether an LOS event has occurred, the method of FIG. 14 decides whether the LOS has just ended (first un-LOS decision step). If yes, then the gain is restored to the last gain value. In other words, when the LOS event is over then the controller 70 may set the gain of amp 20 (via commanding the pump power level) to the last gain value set before the LOS event occurred. The theory is that the last gain value is a good estimate of the appropriate gain value to set when the LOS event has ended and that recovery may be accelerated by using the last gain value.

Figure 15:
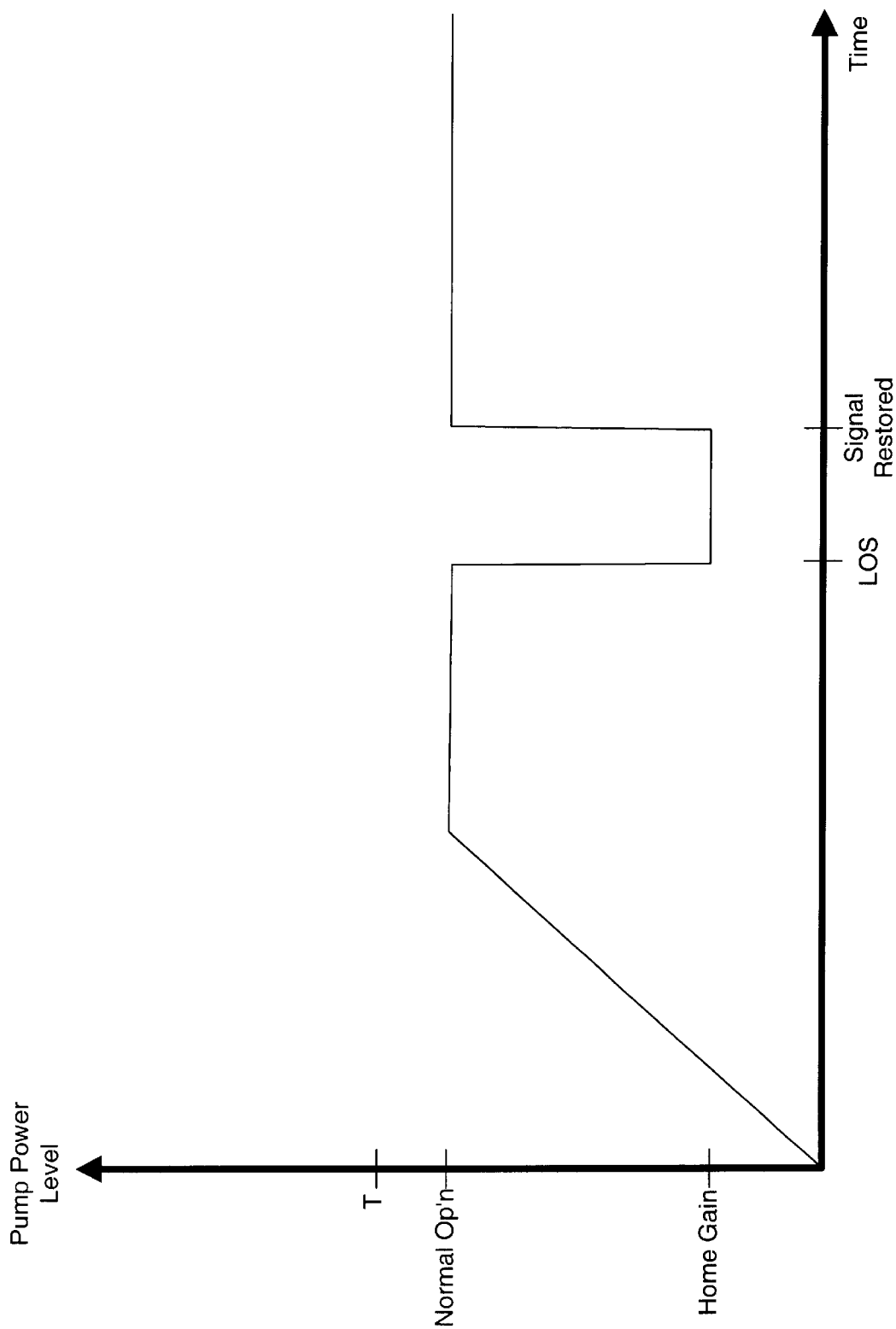
FIG. 15 is a graph of pump power level versus time illustrating some of the LOS declaration and home gain setting features of the invention set forth in FIG. 14.

FIG. 15 graphically illustrates the return to Home Gain upon LOS declaration feature outlined above in relation to FIG. 14. FIG. 15 is an exemplary graph plotting pump power level versus time. The pump power level may be ramped up as shown until normal operation is achieved. A steady state situation may then follow as further illustrated. When the controller 70 declares a LOS event, the pump power level is set to a Home Gain value. When the signal is restored, pump power levels is reset to a last pump power level commanded just before the LOS event occurred. The rest of the graph illustrates a normal operational level.

Figure 16:
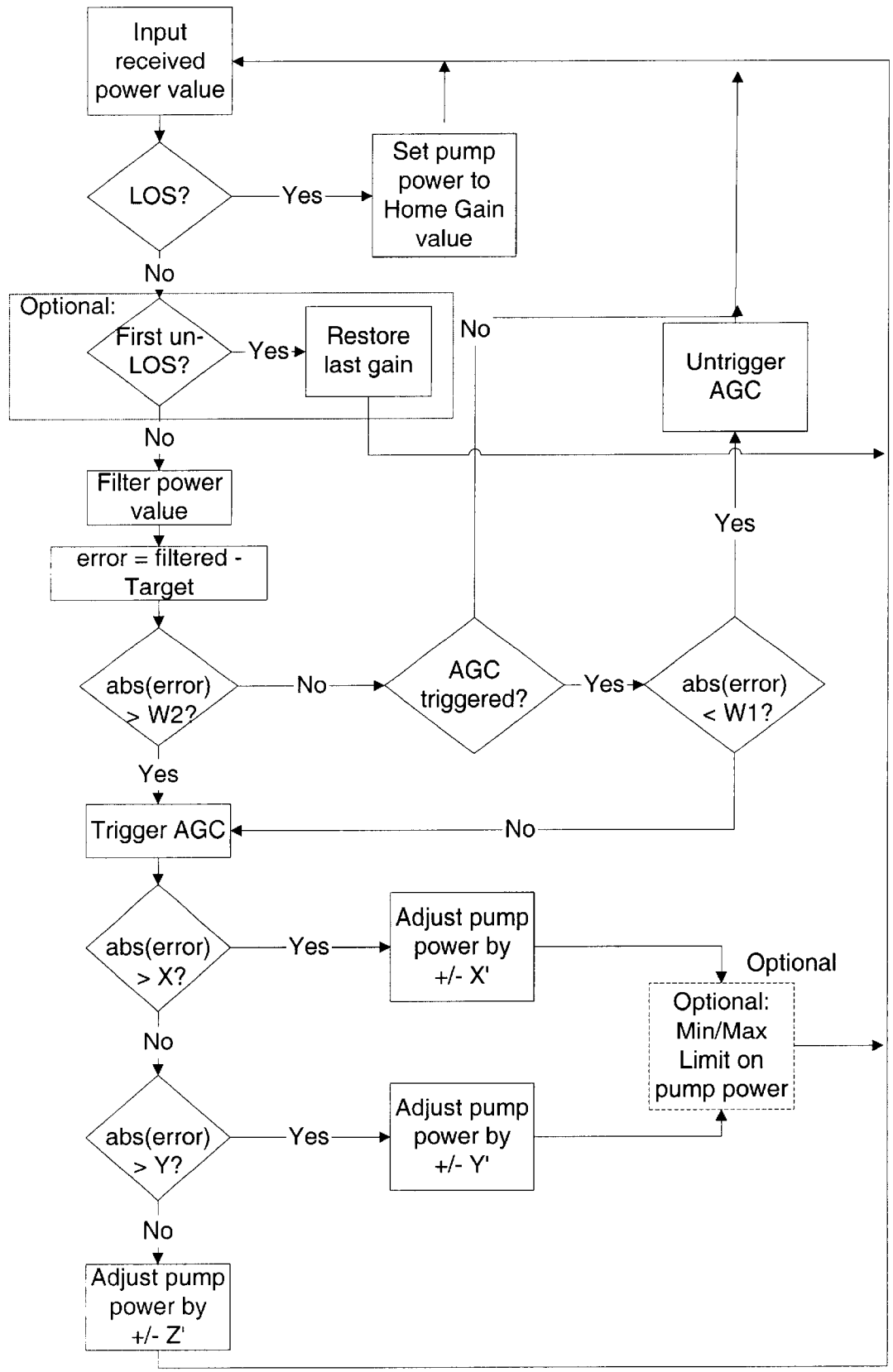
FIG. 16 is a high-level flowchart combining the windowing, gain rate change control, LOS declaration, and home gain setting features of FIGS. 10 and 12.

FIG. 16 combines the gain control algorithms and LOS declaration processing methods of the invention. Specifically, the independent methods of FIGS. 10 and 14 are combined in FIG. 16. Although each of the constituent methods may be used separately as described above, it may be advantageous to combine them such as shown in FIG. 16. Since the steps of FIG. 16 have already been explained above, a detailed description will be omitted here.

For illustration purposes, many of the figures and discussions above speak in terms of raising the pump power, it is to be understood that the pump power may be lowered as well. Likewise, the pump power may be lower than Home Gain depending upon the application. Also, the home gain may be above the target level depending upon the application.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. An apparatus for optically preamplifying a signal being input to a receiving device, comprising:
    an optical amplifier optically coupled to an input port of the receiving device, said optical amplifier optically amplifying an input signal and outputting the amplified signal to the receiving device;
    a controller operatively connected to the receiving device, said controller receiving power measurements from the receiving device indicative of the amplified signal's optical power; and
    a pump optically coupled to said optical amplifier, said pump injecting pumping light into said optical amplifier to provide the optical amplification of the input signal;
    said controller commanding a pump power level output by said pump to perform gain control according to the power measurements received from the receiving device; and
    said controller commanding the pump power level output by said pump such that said optical amplifier turns off gain control when the power measurements received from the receiving device are inside a first window of received power values.

2. The apparatus for optically preamplifying a signal being input to a receiving device according to claim 1,
    said controller commanding the pump power level output by said pump such that said optical amplifier turns on gain control when the power measurements received from the receiving device are outside a second window of received power values.

3. The apparatus for optically preamplifying a signal being input to a receiving device according to claim 1,
    said controller changing a rate of commanded pump power level changes according to how much a current received power level differs from a target received power level.

4. The apparatus for optically preamplifying a signal being input to a receiving device according to claim 3,
    said controller changing the rate of commanded pump power level changes such that the rate is decreased as the magnitude of the difference between the current received power level and the target received power level decreases.

5. The apparatus for optically preamplifying a signal being input to a receiving device according to claim 3,
    said controller changing the rate of commanded pump power level changes to a first, second and third value when the magnitude of the difference between the current received power level and the target received power is greater than a first, second and third threshold, respectively.

6. The apparatus for optically preamplifying a signal being input to a receiving device according to claim 1,
    said controller calculating a filtered power value based on recently received power measurements received from the receiving device; and
    said controller commanding the pump power level output by said pump to perform gain control according to the filtered power value.

7. The apparatus for optically preamplifying a signal being input to a receiving device according to claim 1,
    said controller calculating a new gain value according to (the filtered power value/target power value)/a current gain value.
    said controller commanding the pump power level output by said pump to perform gain control according to the calculated new gain value.

8. The apparatus for optically preamplifying a signal being input to a receiving device according to claim 1,
    said controller limiting a rate of change of pump power levels.

9. The apparatus for optically preamplifying a signal being input to a receiving device according to claim 1,
    said controller translating a current pump power level to a current gain of said optical amplifier to perform gain control.

10. The apparatus for optically preamplifying a signal being input to a receiving device according to claim 1,
    said controller placing a limit on the commanded pump power level such that said controller only permits said pump to amplify the input signal up to the limit and thereby prevents damage to the receiving device.

11. The apparatus for optically preamplifying a signal being input to a receiving device according to claim 1, an OADM receiving a wavelength division multiplexed signal and dropping at least one wavelength onto a drop output port;

said optical amplifier optically communicating with the drop output port of said OADM.

12. The apparatus for optically preamplifying a signal being input to a receiving device according to claim 11, wherein said OADM is operatively connected to a ring network.

13. The apparatus for optically preamplifying a signal being input to a receiving device according to claim 11, wherein said OADM is optically coupled to a linear network.

14. The apparatus for optically preamplifying a signal being input to a receiving device according to claim 1, said optical amplifier optically communicating with a demultiplexer.

15. An method of optically preamplifying a signal being input to a receiving device with an optical amplifier optically communicating with an input of the receiving device, comprising:

receiving power measurements indicative of the amplified signal's optical power;

commanding a pump power level of a pump optically coupled to the optical amplifier, the pump injecting pumping light into the optical amplifier to provide the optical amplification of the input signal;

controlling said commanding step to perform gain control according to the power measurements received by said receiving step; and said controlling step controlling said commanding step to command the pump power level output by the pump such that the optical amplifier turns off the gain control when the power measurements received from said receiving step are inside a first window of received power values.

16. The method of optically preamplifying a signal being input to a receiving device according to claim 15, said controlling step controlling said commanding step to command the pump power level output by the pump such that the optical amplifier turns on the automatic gain control when the power measurements received from said receiving step are outside a second window of received power values.

17. The method of optically preamplifying a signal being input to a receiving device according to claim 15, further comprising:

changing a rate of commanded pump power level changes according to how much a current received power level differs from a target received power level.

18. The method of optically preamplifying a signal being input to a receiving device according to claim 17, said changing step changing the rate of commanded pump power level changes such that the rate is decreased as the magnitude of the difference between the current received power level and the target received power level decreases.

19. The method of optically preamplifying a signal being input to a receiving device according to claim 17, said changing step changing the rate of commanded pump power level changes to a first, second and third value when the magnitude of the difference between the current received power level and the target received power is greater than a first, second and third threshold, respectively.

20. The method of optically preamplifying a signal being input to a receiving device according to claim 15, further comprising:

calculating a filtered power value based on recently received power measurements received by said receiving step; and said controlling step controlling said commanding step to command the pump power level output by the pump to perform gain control according to the filtered power value.

21. The method of optically preamplifying a signal being input to a receiving device according to claim 15, further comprising:

calculating a new gain value according to (the filtered power value/target power value)/a current gain value, commanding the pump power level output by the pump to perform gain control according to the calculated new gain value.

22. The method of optically preamplifying a signal being input to a receiving device according to claim 15, further comprising:

limiting a rate of change of pump power levels.

23. The method of optically preamplifying a signal being input to a receiving device according to claim 15, further comprising:

translating a current pump power level to a current gain of the optical amplifier to perform gain control.

24. The method of optically preamplifying a signal being input to a receiving device according to claim 15, further comprising:

placing a limit on the commanded pump power level commanded by said commanding step to prevent damage to the receiving device.

* * * * *